April 3, 1928.  
W. KOEHLER  
1,664,630  
PROCESS FOR THE PRODUCTION OF MAGNESIUM OXIDE  
Filed Dec. 21, 1923
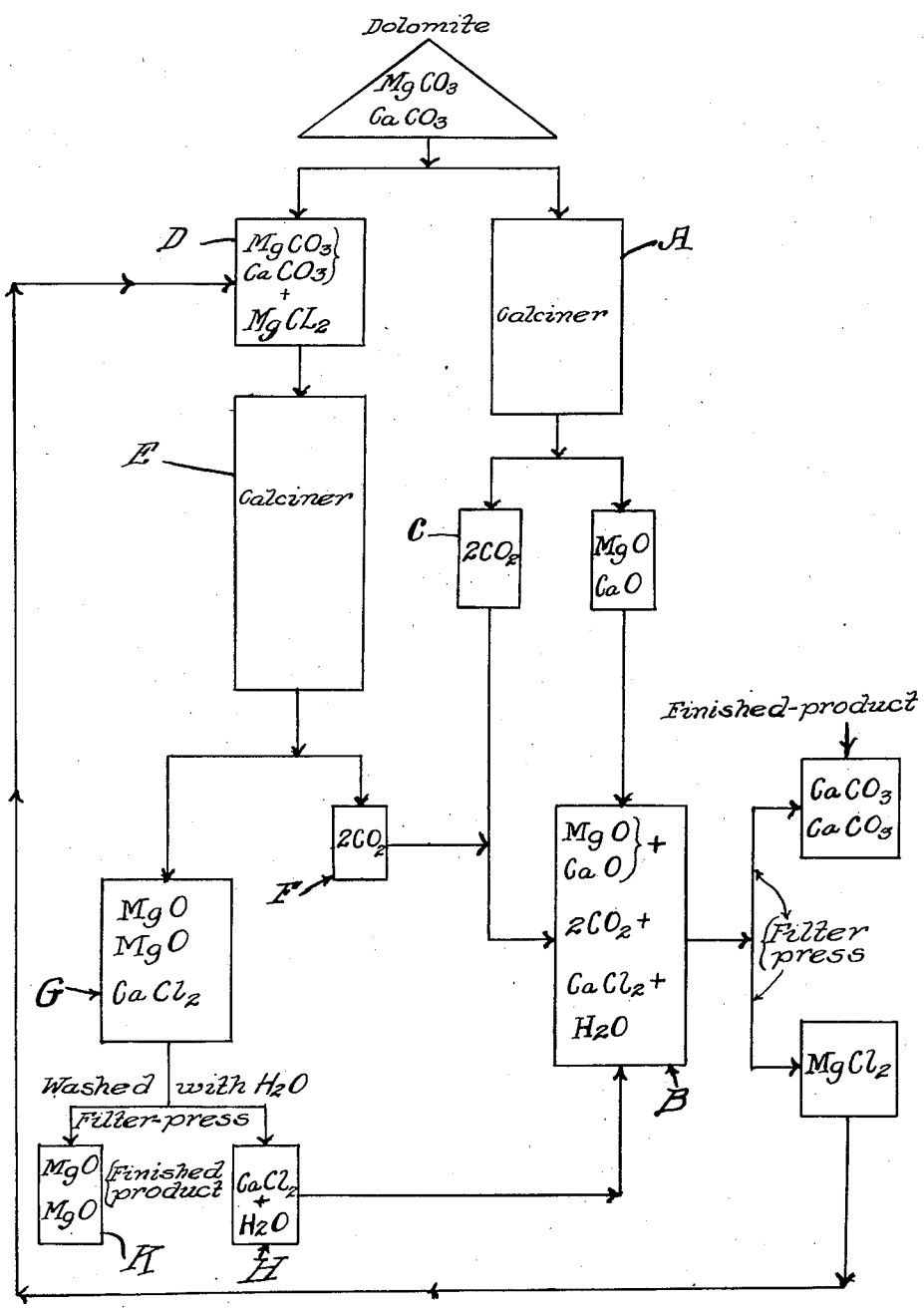

Patented Apr. 3, 1928.

1,664,630

UNITED STATES PATENT OFFICE.

WILLIAM KOEHLER, OF CLEVELAND, OHIO.

PROCESS FOR THE PRODUCTION OF MAGNESIUM OXIDE.

Application filed December 21, 1923. Serial No. 681,979.

This invention relates to a new and improved process for the production of magnesium oxide and calcium carbonate from dolomite and is an improvement on my pending application filed Dec. 4, 1922, Serial No. 607,011.

The object of my invention is to provide a very efficient and economical process for obtaining magnesium oxide and calcium carbonate from dolomite.

My invention therefore consists in treating dolomite with a quantity of magnesium chloride to obtain magnesium oxide and calcium carbonate involving the continuous re-production of the magnesium chloride during the cycle of operation.

The accompanying sheet of drawing diagrammatically shows the operation of my process.

In carrying out my process the dolomite is first reduced to a finely comminuted condition and is then divided into two portions, preferably equal portions, depending upon analysis. One of the portions of dolomite is then placed in a suitable calciner, shown at A, and is subjected to a heat of from 1000 to 1100 C. This calcining of the dolomite causes it to break up into magnesium oxide, calcium oxide and carbonic acid gas. The reaction may be illustrated by the following equation—

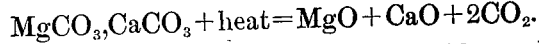

$$MgCO_3, CaCO_3 + heat = MgO + CaO + 2CO_2.$$

The mixture of magnesium oxide and calcium oxide thus obtained is transferred to a suitable container, shown at B. The carbonic acid gas is pumped out of the calciner A, and for the sake of my description, in order that I may go back and take up the treatment of the other portion of my dolomite, I may picture the carbonic acid gas as stored in the container C. In actual practice there will be no break in the sequence of operations.

The other or untreated portion of the dolomite is then placed in a suitable container, shown at D, and into this container is introduced a predetermined quantity of an aqueous solution of magnesium chloride. The dolomite and the magnesium chloride is then thoroughly mixed and may be dried and slightly heated to agglomerate the mass, after which the mass is charged into a calciner, shown at E, where it is subjected to a predetermined temperature.

The calcining of the mixture of dolomite and magnesium chloride causes the formation of magnesium oxide, calcium chloride and carbonic acid gas. The carbonic acid gas is pumped off and I may think of it as stored in a container, shown at F.

The reaction may be illustrated by the following equation:

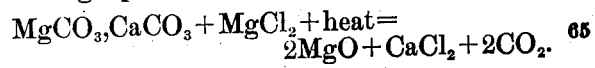

$$MgCO_3, CaCO_3 + MgCl_2 + heat = \\ 2MgO + CaCl_2 + 2CO_2.$$

The calcined mass now consisting of MgO and $CaCl_2$ (magnesium oxide and calcium chloride) is then placed in a suitable container, shown at G, and sufficient water is supplied to the container to break down the mass and dissolve out and form an aqueous solution of calcium chloride. The contents of the container G is then put through a filter press and I may picture the aqueous solution of calcium chloride as being stored in a container, shown at H.

The magnesium oxide, after washing and drying is a finished product, which may be stored in a suitable container, shown at K, ready for the market.

Now I will return to that part of the process which involves the further treatment of that portion of the dolomite which was calcined in its pure or original state in the calciner A.

As soon as the mixture of magnesium oxide and the calcium oxide is placed in the container B, the aqueous solution of calcium chloride, which I have figuratively stored in the container H, is pumped into the container B together with the carbonic acid gas, which was figuratively stored in the containers C and F.

The reaction which then takes place may be represented by the following equation—

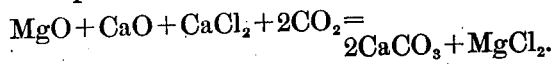

$$MgO + CaO + CaCl_2 + 2CO_2 = \\ 2CaCO_3 + MgCl_2.$$

The contents of the container B, that is the aqueous solution of the magnesium chloride carrying the practically insoluble calcium carbonate is put through a filter press. The calcium carbonate is separated from the aqueous solution of magnesium chloride and is, after washing and drying, a finished marketable product which may be disposed of as desired.

The aqueous solution of magnesium chloride is pumped back into the container D and caused to react on new quanities of the raw material.

It will of course be understood that in actual practice the carrying on of the various reactions is continuous and in a degree simultaneous and that no tanks or containers are used for storage purposes alone. That is to say, the comminuted raw material is fed in a continuous stream to the calciner A and to the container D and the aqueous solution of magnesium chloride is pumped in a constant stream into the container D from the filter press through which it was passed after leaving the container B. Also the finished products, that is the magnesium oxide and the calcium carbonate are continuously produced during the operation of the process.

It may here be noted that while theoretically a finite quantity of magnesium chloride may bring about the decomposition of an infinite quantity of dolomite, in actual practice the transferring of the material from one container to another, decantation, filtration and like operations will cause an unavoidable loss of the magnesium chloride and therefore this loss will have to be made up from time to time by adding slight quantities of fresh magnesium chloride during the prolonged operation of the process.

It may also be stated that the combustion of the fuel in the calciners will cause an excess production of the carbonic acid gas but this excess quantity of the carbonic acid gas may be disposed of as desired and will not affect the operation of the process as described.

What I claim is:—

1. A process for obtaining magnesium oxide and calcium carbonate from raw dolomite comprising, calcining magnesium chloride with raw dolomite to obtain magnesium oxide, calcium chloride and carbon dioxide, dissolving out the calcium chloride and treating a mixture of magnesium and calcium oxide prepared by calcining another portion of raw dolomite by itself with such solution of calcium chloride and with carbon dioxide to form calcium carbonate and magnesium chloride and calcining the magnesium chloride with the raw dolomite in the first step.

2. A cyclic process for obtaining magnesium oxide and calcium carbonate from raw dolomite, comprising calcining a mixture of magnesium chloride and raw dolomite to obtain magnesium oxide, calcium chloride, and carbon dioxide, collecting the carbon dioxide, dissolving out and collecting the calcium chloride, separately calcining a second portion of raw dolomite to obtain magnesium oxide and calcium oxide, and collecting the carbon dioxide, treating said magnesium oxide and calcium oxide with said calcium chloride and carbon dioxide to form magnesium chloride and calcium carbonate, separating said last obtained magnesium chloride and calcium carbonate, and utilizing the magnesium chloride for the decomposition of a new supply of raw dolomite as described in the first step of the process.

In testimony whereof I affix my signature.

WILLIAM KOEHLER.